United States Patent
Fahy et al.

(10) Patent No.: US 12,405,998 B2
(45) Date of Patent: Sep. 2, 2025

(54) SYSTEMS AND METHODS FOR GENERATING PERSONALIZED PLAYLISTS

(71) Applicant: Spotify AB, Stockholm (SE)

(72) Inventors: Colin Patrick Fahy, Brooklyn, NY (US); Leila Catherine Siddique, New York, NY (US); Christopher Ciollaro, Boston, MA (US); Matthew Budelman, Providence, RI (US); Mark VanMiddlesworth, Cambridge, MA (US); Stanislav Chekalin, Brooklyn, NY (US)

(73) Assignee: Spotify AB, Stockholm (SE)

( * ) Notice: Subject to any disclaimer, the term of this patent is extended or adjusted under 35 U.S.C. 154(b) by 348 days.

(21) Appl. No.: 18/048,766

(22) Filed: Oct. 21, 2022

(65) Prior Publication Data

US 2024/0134904 A1   Apr. 25, 2024
US 2024/0232255 A9   Jul. 11, 2024

(51) Int. Cl.
*G06F 16/638* (2019.01)
*G06F 16/635* (2019.01)
*G06F 16/65* (2019.01)
*G06F 16/683* (2019.01)

(52) U.S. Cl.
CPC .......... *G06F 16/639* (2019.01); *G06F 16/635* (2019.01); *G06F 16/65* (2019.01); *G06F 16/685* (2019.01)

(58) Field of Classification Search
None
See application file for complete search history.

(56) References Cited

U.S. PATENT DOCUMENTS

| | | | |
|---|---|---|---|
| 2012/0166436 A1 | 6/2012 | Kalasapur et al. | |
| 2016/0328409 A1 | 11/2016 | Ogle et al. | |
| 2016/0334979 A1* | 11/2016 | Persson | H04L 51/214 |
| 2017/0357479 A1* | 12/2017 | Shenoy | G06F 3/165 |
| 2018/0121432 A1 | 5/2018 | Parson et al. | |
| 2019/0258335 A1* | 8/2019 | Beaumier | G06F 16/632 |
| 2019/0272286 A1* | 9/2019 | Casillas | G06F 16/60 |

(Continued)

OTHER PUBLICATIONS

John Magnusson, Finding time-based listening habits in users music listening history to lower entropy in data, Degree Project in Computer Science and Engineering, Second Cycle, Master's Programme, Jun. 15, 2021, 113 pages.

(Continued)

*Primary Examiner* — Walter F Briney, III
(74) *Attorney, Agent, or Firm* — Morgan, Lewis & Bockius LLP

(57) ABSTRACT

The various implementations described herein include methods and devices for generating personalized playlists. In one aspect, a method includes obtaining information about recent media items presented to a user, the information including data about a respective time of day and day of week each media item was presented to the user. The method further includes grouping the recent media items into clusters based on time of day and day of week; and generating a recommendation vector using a weighted average of the clusters. The method also includes generating a playlist for the user by identifying a plurality of media items using the recommendation vector; and presenting the playlist to the user.

20 Claims, 8 Drawing Sheets

(56) References Cited

U.S. PATENT DOCUMENTS

2020/0401908 A1* 12/2020 Ortega ................ G06V 10/762
2021/0326029 A1   10/2021 Persson et al.
2022/0374474 A1* 11/2022 Pal ..................... G06F 16/9535

OTHER PUBLICATIONS

Dan Yang, Jing Zhang, Sifeng Wang, XueDong Zhang, "A Time-Aware CNN-Based Personalized Recommender System", Complexity, vol. 2019, Article ID 9476981, 11 pages, 2019. https://doi.org/10.1155/2019/9476981.

Seungheon Doh, Junwon Lee, and Juhan Nam. 2021. Music Playlist Title Generation: A Machine-Translation Approach. In Proceedings of the 2nd Workshop on NLP for Music and Spoken Audio (NLP4MusA), 5 pages, Online. Association for Computational Linguistics.

* cited by examiner

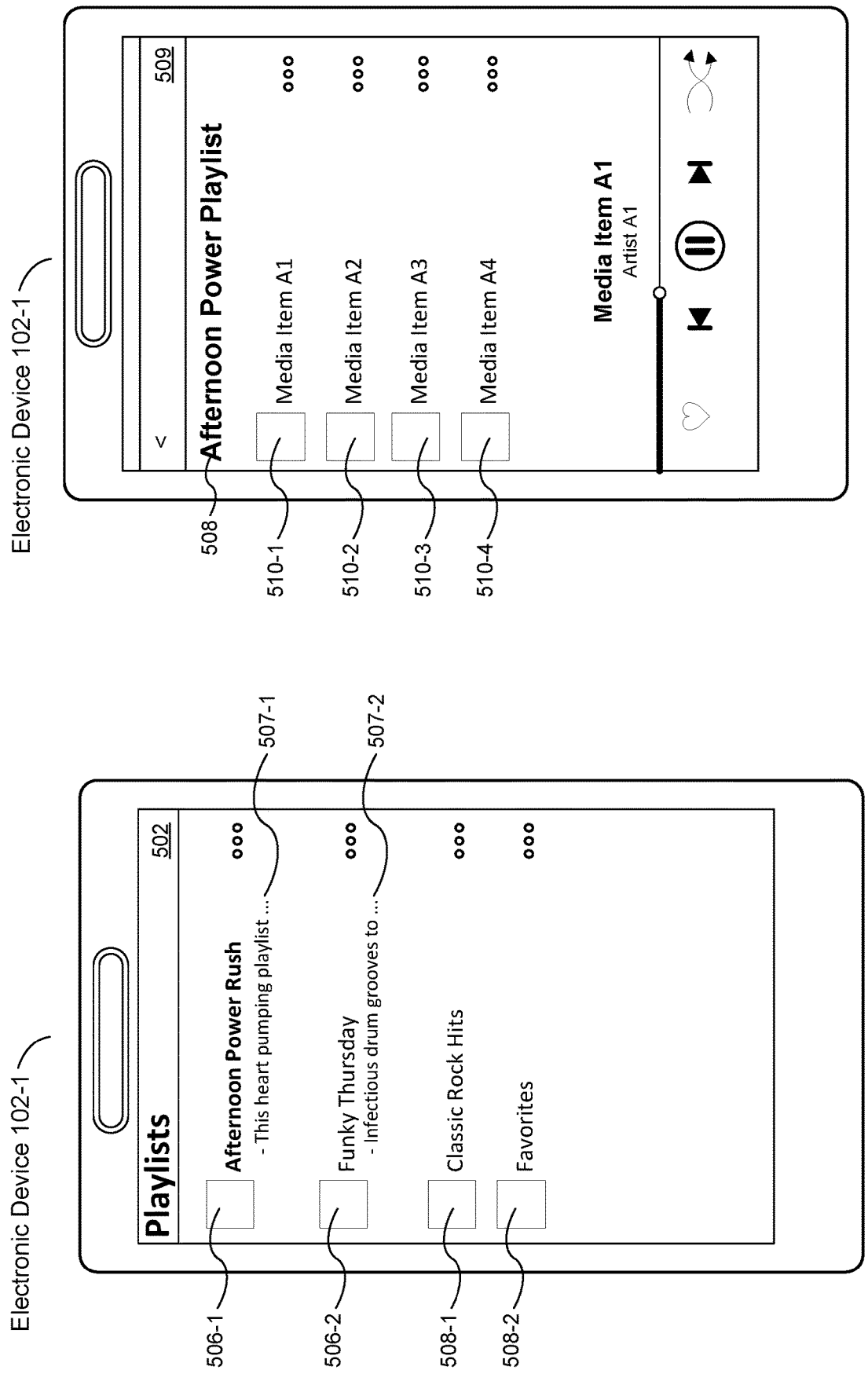

SYSTEMS AND METHODS FOR GENERATING PERSONALIZED PLAYLISTS

TECHNICAL FIELD

The disclosed embodiments relate generally to media provider systems including, but not limited to, systems and methods for discovering and recommending media to users.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. Recommender systems commonly retrieve preferred items for users from a massive number of items by modeling users' interests based on historical interactions. However, users' interests can vary widely based on their current situation (e.g., working, resting, or exercising), which can change throughout the day and the week.

SUMMARY

Recommender Systems (RS) are applied to applications to retrieve relevant information. Recommender Systems can provide personalized recommendations of items (e.g., personalized playlists) to alleviate information overload for users, e.g., recommendations for audio content and streaming. Many personalized playlists only update once a day or less and don't include temporal considerations. The systems described herein are able to generate real-time music recommendations based on a user's habits of what they usually listen to at the current time of day and/or day of the week.

For example, the systems described herein generate and present to users changing playlists with real-time (e.g., up-to-the-minute) recommendations based on the current time of day and day of the week. Additionally, dynamic playlist titles and descriptors can be generated to describe the contents of the playlists (e.g., how they fit the user's listening habits formed for the time of day). In some embodiments, the playlist titles and descriptors emphasize differences from the user's overall listening habits.

As an example, the system retrieves recent media items (e.g., 500, 1000, or 2000 most recent media items) from the user's listening history. In this example, the system clusters media items by time of day, day of week, day and time, and real-time (e.g., media items from last 30 minutes, 1 hour, or 2 hours). The system in this example, uses media item vectors to compute the cosine distance from the centroid of each cluster to the total list of media items. The system may use the cosine distance to attach higher weights to more distinctive clusters. To continue the example, the system uses a weighted average of cluster vectors to generate a single aggregate recommendation vector. A nearest-neighbors service can be called to get media item recommendations close to this vector. The media item recommendations can be filtered to exclude any media items from the user's recent listening history and/or to remove types of content the user has indicated they want to exclude from recommendations. The system in this example may also retrieve descriptors for the clusters (e.g., at least the top ranked cluster) to get relevant weighted tags for the recommendation media items and each cluster. The system can select the most common descriptors for the media items by summing their descriptor weights and increase the weight of descriptors that over-index compared to the user's overall listening descriptors. The system can then generate the playlist title and description from selected descriptors (e.g., use descriptors from the cluster with the highest weight). The descriptors can be used to include time and/or day information as a part of the playlist title (e.g., "morning," "Friday," or "Friday morning"). The system can also select a playlist image based, for example, on the current time in the user's time zone.

Conventionally, a user wanting a variety of playlists for different situations would need to navigate multiple menus (user interfaces) to create and populate each playlist (as well as to update the playlists). Populating each individual playlist may require a large number of searches for media items. These processes may require significant power consumption, processing, and network resources. The systems and devices described herein provide improved methods and interfaces for generating and presenting context-based playlists. The improved methods and interfaces may reduce the number of inputs needed for a user to create a context-based playlist and may perform the generation (and subsequent updating) automatically (without requiring user input) when a set of conditions have been met. In this way, a more efficient man-machine interface is enabled, which can result in reduced power consumption and less required processing at the user device (e.g., a mobile device having limited battery power) and less required network resources (e.g., between the mobile device and a server system).

In accordance with some embodiments, a method of recommending content to a user is provided. The method is performed at a computing device having one or more processors and memory. The method includes: (1) obtaining information about recent media items consumed (e.g., played back, listened to, and/or viewed) to a user, the information including data about a respective time of day and day of week each media item was presented to the user; (2) grouping the recent media items into clusters based on time of day and day of week; (3) generating a recommendation vector using a weighted average of the clusters; (4) generating a playlist for the user by identifying a plurality of media items using the recommendation vector; and (5) causing the playlist to be presented to the user.

In accordance with some embodiments, an electronic device is provided. The electronic device includes one or more processors and memory storing one or more programs. The one or more programs include instructions for performing any of the methods described herein (e.g., the method 600).

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein (e.g., the method 600).

Thus, methods and systems are disclosed that identify and recommend content and media to users. Such methods and systems may complement or replace conventional methods and systems of identifying and recommending content and media to users.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5B illustrate example user interfaces for media content playback in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The present disclosure describes systems and methods for creating and distributing playlists based on users' habitual listening for a given time, day, or other context information. For example, a user may prefer meditative music during their work hours. The same user may prefer hip-hop music when exercising after work, and dance music on the weekends. Conventional recommendation systems may recommend a mixture of all three types (genres) of music for the user at any given time, or the recommendation system may only recommend music of the most dominant type. The systems described herein cluster the user's listening habits by time, day, and/or other contextual indicators (if available). Additionally, in some situations the time of day may be the most important factor (e.g., the user listens to the same genre of music before bed each day), while in other situations, the day of the week may be more important (e.g., the user listens to dance music every Friday). In some embodiments, the user's listening history is clustered by time, day, and/or other contextual information and the clusters are weighted (e.g., by distinctives) to generate a recommendation vector for a user's current context (e.g., time, day, or indicated setting). The recommendation vector is used to identify media items to include in a playlist. Moreover, descriptors (e.g., tags and labels) from the recommended media items can be used to create a title and description for the playlist. In some embodiments, the cluster information is used in the title and/or description of the playlist. For example, a playlist generated based on a time-of-day cluster could be titled "Your Afternoon Smooth Listening Playlist" to indicate to the user that the playlist corresponds to the time of day.

Media Content Delivery System

Figure 1:
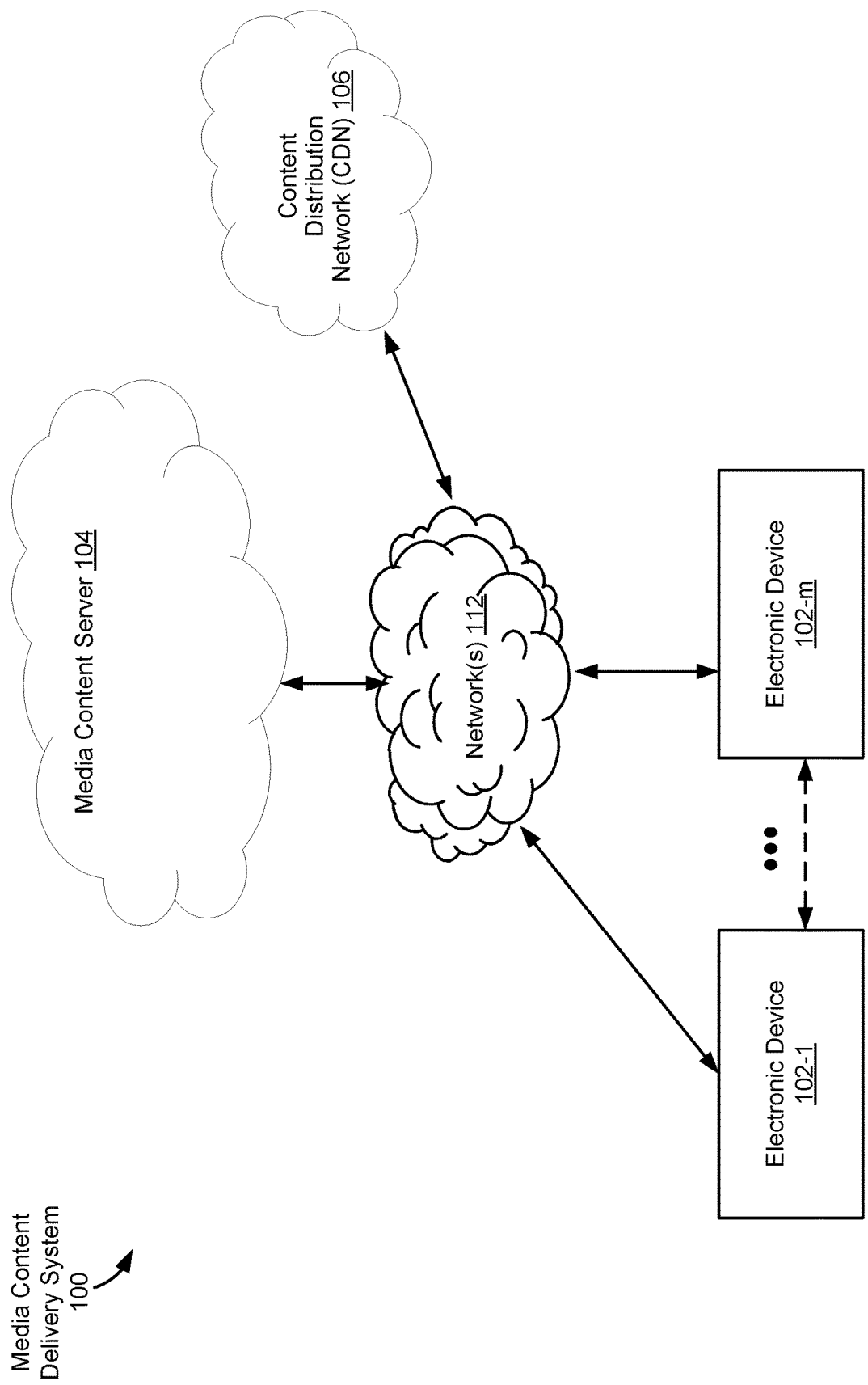
FIG. 1 is a block diagram illustrating an example media content delivery system in accordance with some embodiments.

FIG. 1 is a block diagram illustrating a media content delivery system 100 in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-*m* to stream content (e.g., data for media items) for playback on the electronic device 102-*m*.

In some embodiments, electronic device 102-1 and/or electronic device 102-*m* include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
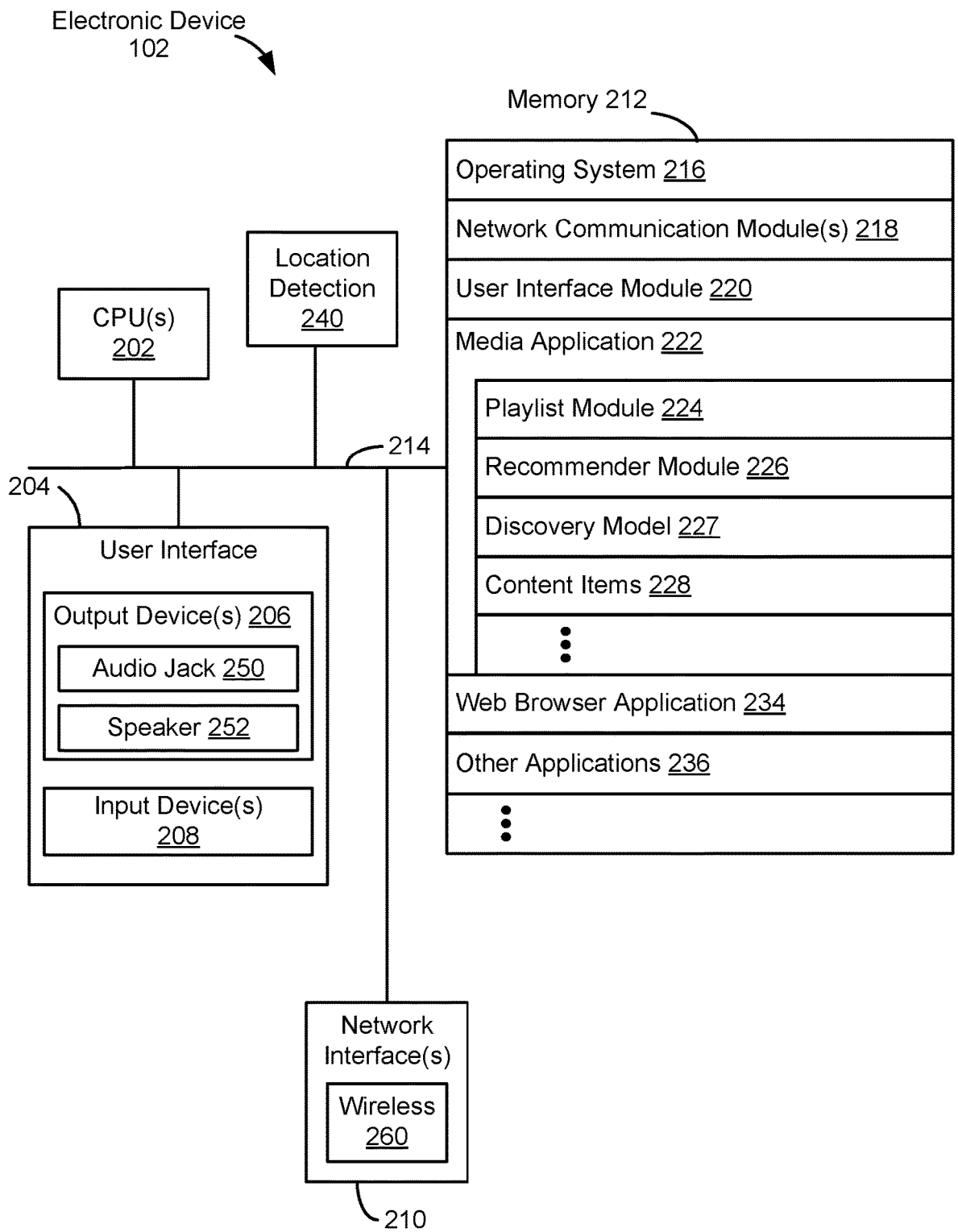
FIG. 2 is a block diagram illustrating an example electronic device in accordance with some embodiments.

FIG. 2 is a block diagram illustrating an electronic device 102 (e.g., electronic device 102-1 and/or electronic device 102-*m*, FIG. 1), in accordance with some embodiments. The electronic device 102 includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
    - a playlist module 224 for storing sets of media items for playback in a predefined order;
    - a recommender module 226 for identifying and/or displaying recommended media items to include in a playlist;
    - a discovery model 227 for identifying and presenting media items to a user;
    - a content items module 228 for storing media items, including audio items such as podcasts and songs, for playback and/or for forwarding requests for media content items to the media content server;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
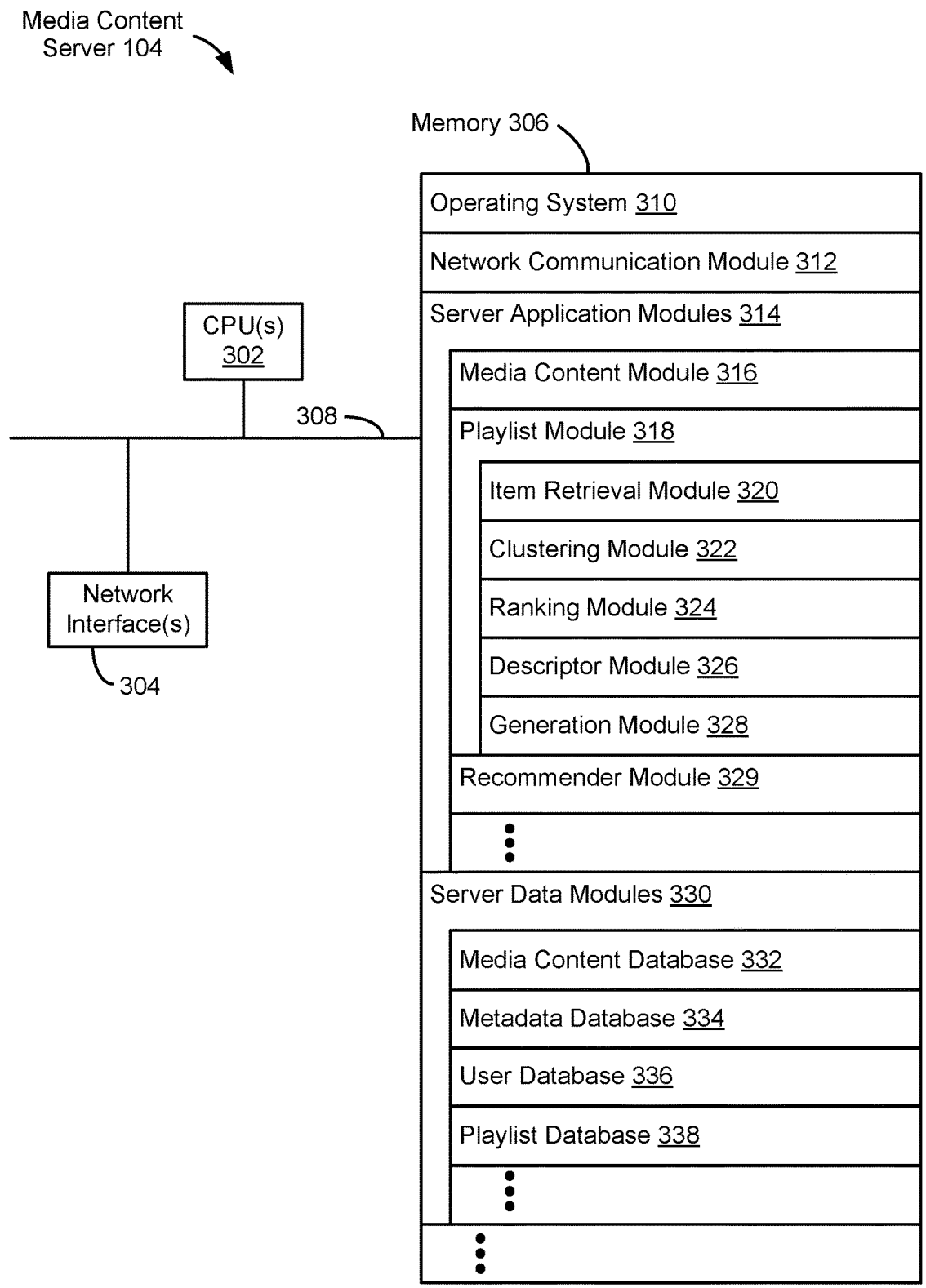
FIG. 3 is a block diagram illustrating an example media content server in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random-access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
    - a media content module 316 for storing one or more media content items and/or sending (e.g., streaming), to the electronic device, one or more requested media content item(s);
    - a playlist module 318 for generating, storing, and/or providing (e.g., streaming) sets of media content items to the electronic device 102; in some embodiments, the playlist module 318 includes one or more of:
        - an item retrieval module 320 configured to retrieve media item information from a user's listening history (e.g., retrieve information about the previous 500 or 1000 media items presented to the user);
        - a clustering module 322 configured to cluster media items based on context information (time of day, day of week, real-time, etc.) and generate cluster and recommendation vectors from the clustered media items;
        - a ranking module 324 configured to rank, weight, and/or filter items (e.g., media items, clusters, vectors, descriptors, etc.) based on system-defined and/or user-defined criteria; in some embodiments, the ranking module 324 sequences media items to generate a playlist;
        - a descriptor module 326 configured to retrieve, generate, store, and/or provide descriptors such as tags and labels for media items and playlists; and a generation module 328 configured to generate playlists, titles, and descriptions (e.g., based on a user's history and/or current context); and a recommender module 329 for determining and/or providing recommendations such as recommended media items and/or recommended playlists;

one or more server data module(s) 330 for handling the storage of and/or access to media items and/or metadata relating to the media items; in some embodiments, the one or more server data module(s) 330 include:

a media content database 332 for storing media items. In some embodiments, media content database 332 stores vector representations of media items in addition to the media items themselves. In some embodiments, the vector representations of the media items are generated based on a plurality of features of the media items (e.g., genre, artist, acoustic features, etc.) such that similar media items result in similar vectors (e.g., vectors having a small cosine distance between them). In some embodiments, the vector representations are embedded in a vector space;

a metadata database 334 for storing metadata relating to the media items, including a genre associated with the respective media items;

a user database 336 for storing user profile data, historical usage data, and/or preferences data; and a playlist database 338 for storing system-generated and/or user-generated playlists.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (e.g., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Playlist Generation

Figure 4A:
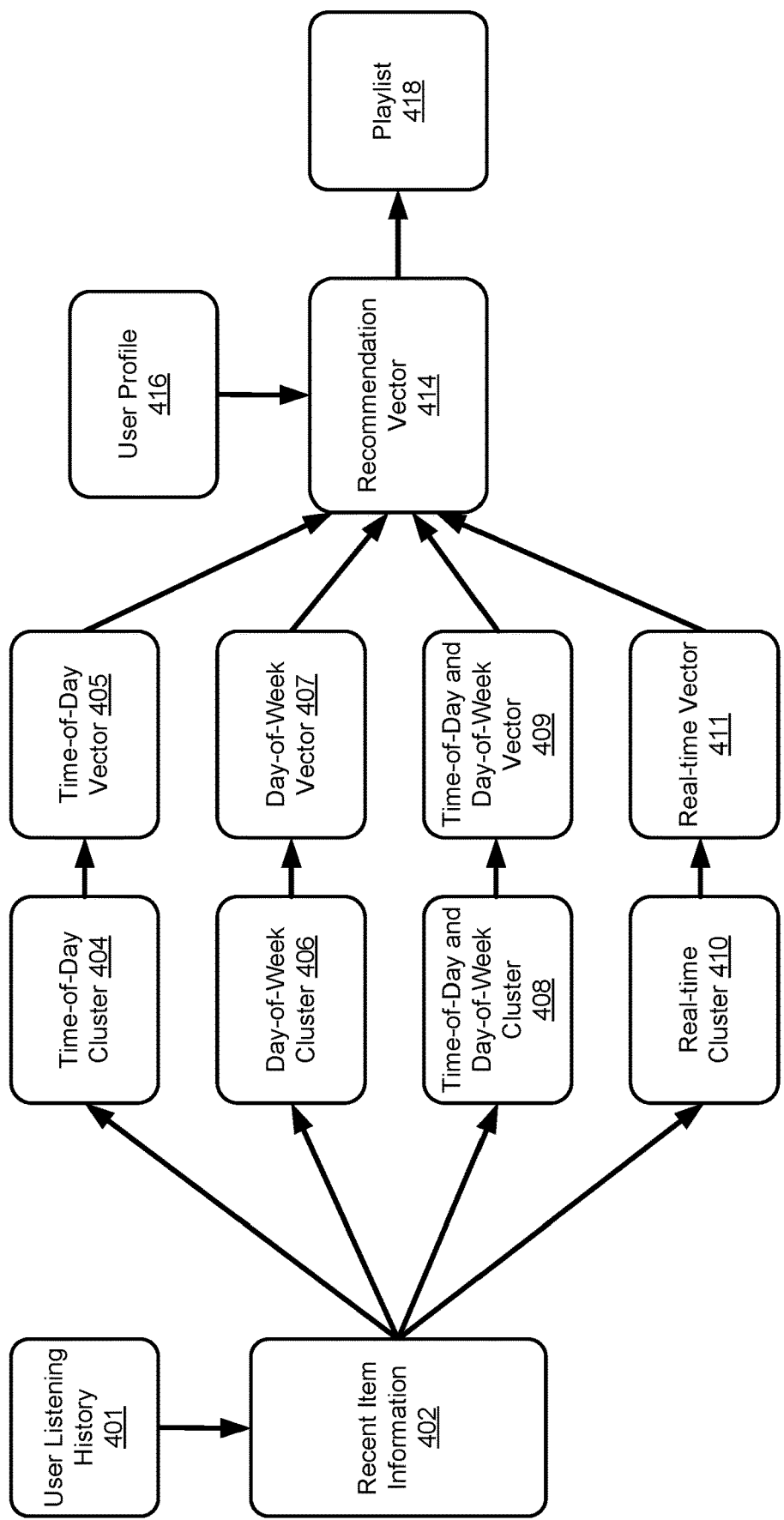
FIG. 4A is a block diagram illustrating an example playlist generation process in accordance with some embodiments.

FIG. 4A is a block diagram illustrating an example playlist generation process in accordance with some embodiments. As shown in FIG. 4A, recent item information 402 (e.g., information about the last 500, 1000, or 2000 most recently played tracks) is retrieved from a user's listening history 401. In some embodiments, the recent item information 402 includes the metadata for each item (e.g., title, description, tags, genre, artist, and the like). The recent item information 402 is used to generate multiple clusters. The time-of-day cluster 404 includes recent media items that the user listened to during a particular time of day (e.g., morning, afternoon, evening, or night). In some embodiments, the time-of-day cluster includes media items for a preset time period (e.g., 12:30 PM to 4:30 PM). In some embodiments, the time-of-day cluster includes media items for a window of time based on the user's current time. For example, the window of time extends from 1 hour before the current time to 1 hour after the user's current time. The day-of-week cluster 406 includes recent media items that the user listened to during a particular day (e.g., Monday, Tuesday, Wednesday, Thursday, Friday, Saturday, or Sunday). The time-of-day and day-of-week cluster 408 includes recent media items that the user listened to during a particular time period of a particular day (e.g., on Fridays between 1:30 PM and 4:30 PM). The real-time cluster 410 includes recent media items the user to which the user has most recently listened (e.g., the last 50 media items played).

Suppose for example that the playlist is being generated for a user on a Friday afternoon. In this example, the time-of-day cluster 404 would include recent media items the user listened to during the afternoon time (e.g., between 1:00 PM and 4:00 PM). The day-of-week cluster 406 would include recent media items the user listened to on a Friday. The time-of-day and day-of-week cluster 408 would include recent media items the user listened to during the afternoon on Fridays. The real-time cluster 410 would include a set of most recently played media items (e.g., most recent 30 media items).

A vector is generated for each cluster, including a time-of-day vector 405, a day-of-week vector 407, a time-of-day and day-of-week vector 409, and a real-time vector 411. In some embodiments, vector representations of the media items are within each cluster are generated based on a plurality of features of the media items (e.g., genre, artist, acoustic features, etc.) such that similar media items result in similar vectors (e.g., vectors having a small cosine distance between them). In some embodiments, the vector representations are embedded in a vector space, and the vector generated for each cluster is embedded in the same vector space (e.g., is a vector of the same dimensionality as the vectors representing the media items). In some embodiments, the vector generated for each cluster is an unweighted averages of the vectors representing the media items within the cluster. In some embodiments, the vector generated for a cluster is a weighted averages of the vectors representing the media items within the cluster. In some embodiments, a weight is assigned to each media item using a heuristic based on a context in which the media item was played back and/or a percentage of the media item that was played back. In some embodiments, the vector generated for a cluster is a vector centroid of vectors of respective media items in the cluster.

In some embodiments, more distinctive clusters are ranked (e.g., weighted) higher than less distinctive clusters.

For example, a cosine distance is computed from the centroid of each cluster to a centroid of the overall set of media items, and the cosine distance is used as a measure of distinctiveness. A recommendation vector 414 is generated from the vectors 405, 407, 409, 411, and 413. In some embodiments, the recommendation vector 414 is generated from an average of the vectors 405, 407, 409, 411, and 413. In some embodiments, information about the user's overall activities and preferences is obtained from a user profile 416. In some embodiments, the information from the user profile 416 is used to adjust the recommendation vector 414 toward discovery (e.g., away from the user's standard listening experience). In some embodiments, the user profile 416 includes a centroid vector (e.g., that represents the user profile) and a directional vector is determined by subtracting the recommendation vector 414 from the centroid vector. In some embodiments, the recommendation vector and/or the directional vector are unit vectors. In some embodiments, the directional vector is combined (e.g., summed with) the recommendation vector 414 to generate an adjusted recommendation vector (e.g., a vector that emphasizes features that are distinct from the centroid vector). In some embodiments, a weight is applied to the directional vector when combining with the recommendation vector 414. In some embodiments, the weight applied to the directional vector is in the range [0,1], where higher values represent more emphasis on discovery and lower values represent less emphasis on discovery. In some embodiments, the adjusted recommendation vector is used to identify media item recommendations. In some embodiments, the user profile 416 includes an overall recommendation vector and the recommendation vector 414 is adjusted away from the overall recommendation vector. The (adjusted) recommendation vector 414 is used to identify media item recommendations (e.g., find nearest neighbors for the recommendation vector). The media item recommendations are used to generate a playlist 418. In some embodiments, the playlist 418 is presented to the user (e.g., at an electronic device 102 of the user). In some embodiments, the playlist 418 is stored (e.g., at the playlist database 338) for the user for a preset amount of time (e.g., 20 minutes to 3 hours). In some embodiments, the playlist 418 is stored until a different time period begins (e.g., the time changes from an afternoon period to an evening period).

In some embodiments, user media item plays are retrieved from a user listening history (e.g., the user listening history 401). In some embodiments, the media items are clustered by time of day, day of week, time and day, real-time (e.g., 40 most recent played media items), and the like. In some embodiments, if a cluster includes more than a threshold number of media items, a random sample of media items is selected for the cluster to reduce the dimensionality. In some embodiments, if a cluster includes more than a threshold number of media items, more recently played media items are selected for the sample over less recently played media items. In some embodiments, a cosine distance from the centroid of each cluster to the total list of media items is computed and clusters with higher distance (e.g., more distinctive clusters) are weighted higher. In some embodiments, the clusters are also weighted using a heuristic weighting algorithm (e.g., the heuristic weights are multiplied with the cosine distance weights). In some embodiments, the heuristic weighting algorithm includes weights for each cluster (e.g., manually-assigned weights). In some embodiments, the day-and-time cluster is weighted higher than the time-of-day cluster, the day-of-week cluster, and the real-time cluster. For example, the day-and-time cluster is assigned a highest weight, the time-of-day cluster is assigned a second highest weight, the day-of-week cluster is assigned a third highest weight, and the real-time cluster is assigned a fourth highest weight. In some embodiments, an average (e.g., a weighted average) of the cluster vectors is used to generate an aggregate recommendation vector. In some embodiments, the aggregate recommendation vector is used to obtain media item recommendations (e.g., via a nearest-neighbor service or application of a nearest-neighbor algorithm). In some embodiments, the media item recommendations are filtered and ranked (e.g., sequenced) then presented to the user as a playlist. In some embodiments, the filters include a filter to remove (or reduce) media items to which the user has recently listened (e.g., listened to in the last 10, 7, or 3 days) and a filter to remove media items with content that the user has indicated they don't want (e.g., explicit content and/or content that the user has requested be excluded from recommendations). In some embodiments, unplayable media items are filtered out of the playlist. In some embodiments, duplicate media items are filtered out of the playlist. In some embodiments, the media items are ranked by artist and/or popularity. In some embodiments, the playlist is stored at a server (and/or user device) for subsequent playback by the user. In some embodiments, the playlist is stored for a threshold amount of time to avoid re-creating the playlist too often (e.g., stored for 20 minutes, 1 hour, or 3 hours).

Figure 4B:
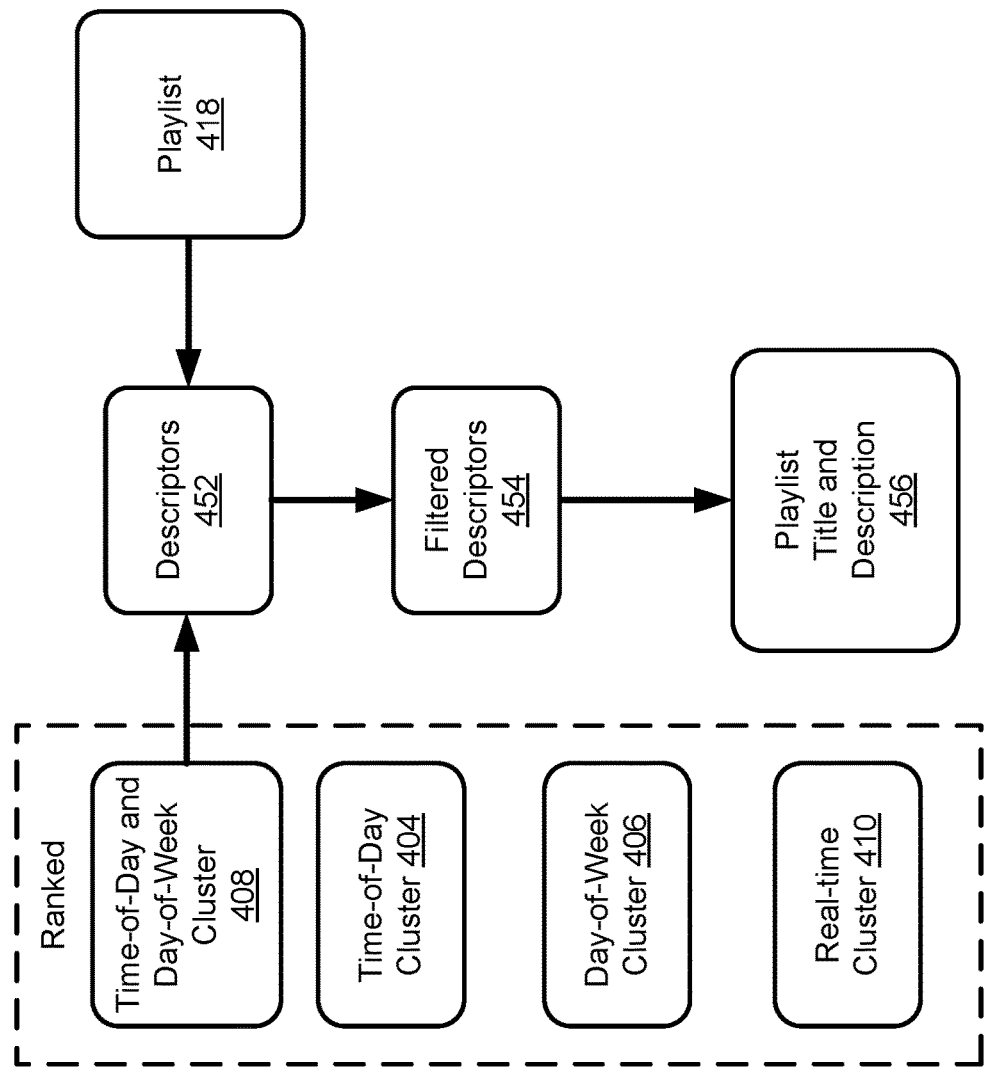
FIG. 4B is a block diagram illustrating an example playlist title and description generation process in accordance with some embodiments.

FIG. 4B is a block diagram illustrating an example playlist title and description generation process in accordance with some embodiments. As described previously with respect to FIG. 4A, the recent item information 402 is retrieved from the user's listening history 401. The recent item information 402 is used to generate the clusters 404, 406, 408, 410, and 412. In the example of FIG. 4B, the clusters are ranked (e.g., based on distinctiveness from the user's overall listening). In some embodiments, the clusters are assigned default weights (e.g., with the cluster 408 ranked highest). In some embodiments, the clusters are also weighted using heuristic weighting algorithm. In some embodiments, a cosine distance from the centroid of each cluster to the total list of media items is computed and clusters with higher distance (e.g., more distinctive clusters) are weighted higher.

In accordance with some embodiments, descriptors 452 are obtained for the media items in the highest ranked cluster (the cluster 408) and the media items in the playlist 418. In some embodiments, descriptors are obtained from a plurality of clusters (e.g., the top 2 or 3 clusters). In some embodiments, the descriptors 452 are obtained from the playlist 418, but not from the clusters (e.g., so that the resulting title and description more closely reflect media items in the playlist 418).

The descriptors 452 are filtered (and ranked) to obtain the filtered descriptors 454. In some embodiments, the descriptors 452 are filtered to remove (or downweight) descriptors on genre, activity, and time. In some embodiments, the descriptors 452 are filtered to remove (or downweight) descriptors that are common in the user's listening history. In some embodiments, the descriptors from the playlist media items that match descriptors from the cluster(s) are filtered out or downweighted (e.g., to emphasize differences between playlist 418 and the cluster(s)). The filtered descriptors 454 are used to generate information 456 (e.g., a title, description, and/or tags) for the playlist 418. In some embodiments, the descriptors from the cluster(s) are used to generate a first part of the description for the playlist and the descriptors from the playlist media items are used to generate a second part of the description. An example description could be "Based on your interest in funky music in the afternoons, this bluesy playlist has been created for you." In this example, the "funky music" part of the description comes from descriptors of the cluster(s) and the "bluesy playlist" part of the description comes from descriptors of the playlist. In some embodiments, descriptors related to mood are weighted higher than other types of descriptors. In some embodiments, duplicate (or similar) descriptors are filtered out.

In some embodiments, descriptors 452 (e.g., tags and labels) are obtained for media items in the clusters and recommendations. For example, descriptors in the top cluster(s) are obtained as well as descriptors in the media item recommendations. In some embodiments, the descriptors are used to generate a title, description, and/or tags for the playlist. In some embodiments, the descriptors are ranked (weighted) and the highest ranked descriptors (e.g., the top 2, 5, or 10 descriptors) are used to generate the title, description, and/or tags for the playlist. In some embodiments, a higher weight is applied to descriptors that appear more often in the playlist 418 media items (e.g., most common descriptors for the media items are identified by summing their weights). In some embodiments, descriptors that over-index compared to the user's overall listening descriptors are weighted higher. In some embodiments, genre and activity descriptors are down weighted. In some embodiments, time descriptors are down weighted or filtered out (e.g., if the time descriptor doesn't match the user's current time of day). In some embodiments, mood descriptors are upweighted. In some embodiments, the user's time of day or day of the week information is used to generate the playlist title (e.g., "Your Friday Morning Mix").

FIGS. 5A-5B illustrate example user interfaces for media content playback in accordance with some embodiments. FIG. 5A shows a user interface 502 displayed on the electronic device 102-1. The user interface 502 in FIG. 5A shows a list of playlists for a user. The list of playlists includes a generated playlist 506-1 (e.g., based on time of day) entitled "Afternoon Power Rush" and a generated playlist 506-2 (e.g., based on day of week) entitled "Funky Thursday." The list of playlists further includes other types of playlists 508 (e.g., classic rock hits playlist 508-1 and favorites playlist 508-2). The generated playlist 506-1 includes a corresponding description 507-1 and the generated playlist 506-2 includes a corresponding description 507-2. FIG. 5B shows a playlist user interface 509 displayed on the electronic device 102-1 (e.g., in response to a user selection of the generated playlist 506-1). The playlist user interface 509 includes a playlist title 508 and a list of media items 510 in the playlist 506-1. In some embodiments, the playlist user interface 509 further includes the description for the playlist (e.g., the description 507-1).

Figure 6A:
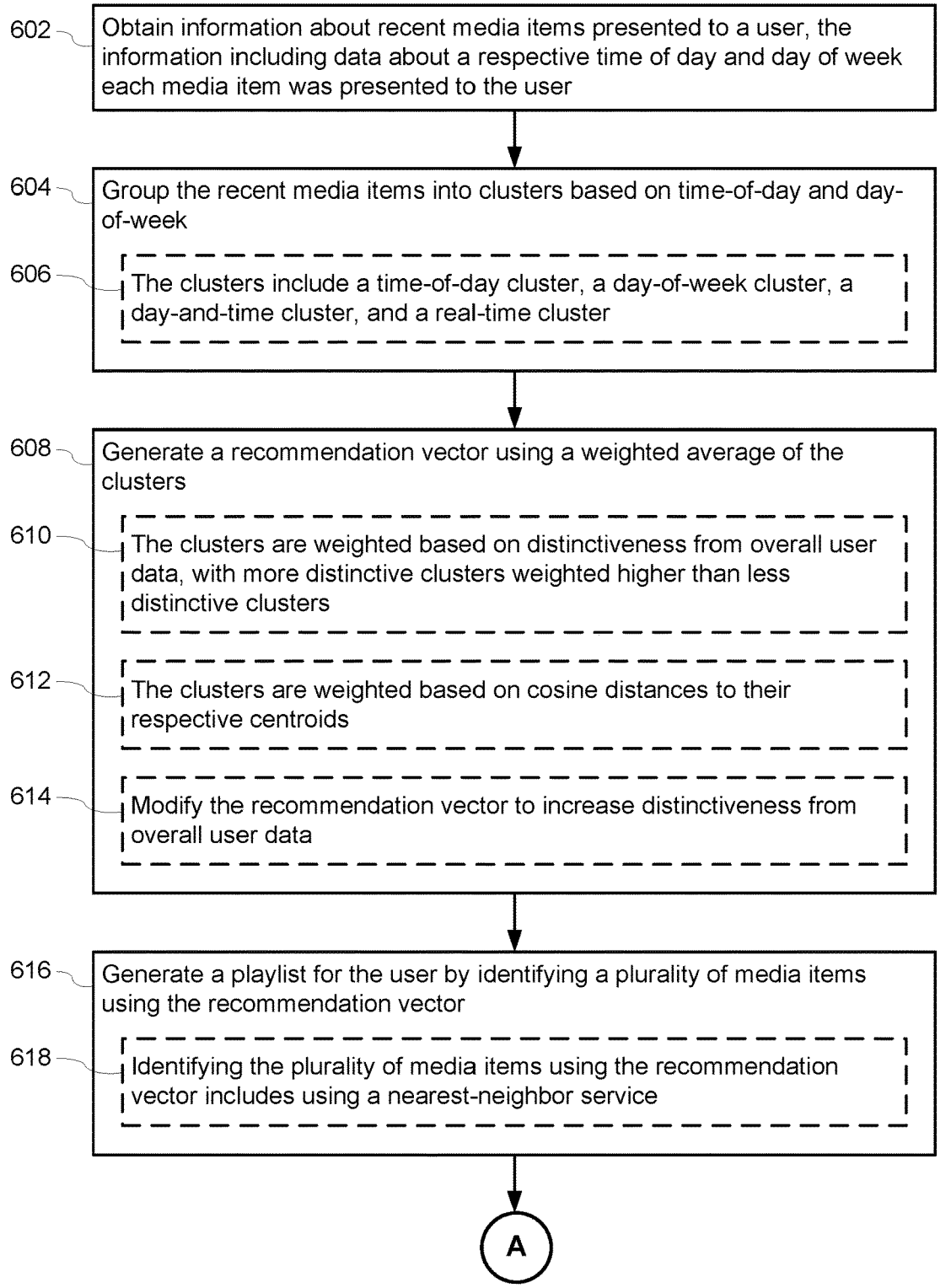
FIGS. 6A-6B are flow diagrams illustrating an example method of recommending content to a user in accordance with some embodiments.
Figure 6B:
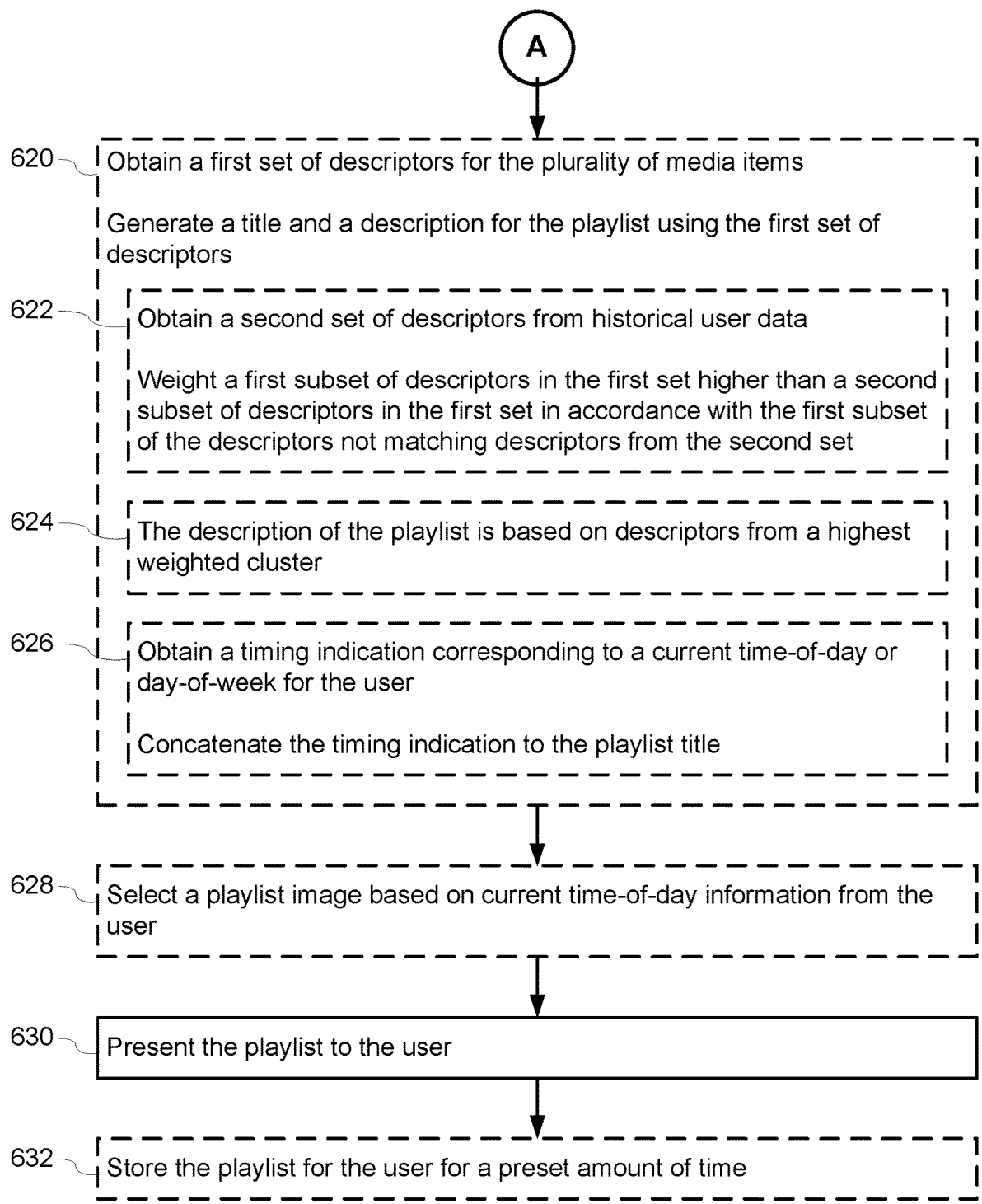

FIGS. 6A-6B are flow diagrams illustrating a method 600 of recommending content to a user in accordance with some embodiments. The method 600 may be performed at a computing system (e.g., media content server 104 and/or electronic device(s) 102) having one or more processors and memory storing instructions for execution by the one or more processors. In some embodiments, the method 600 is performed by executing instructions stored in the memory (e.g., memory 212, FIG. 2, memory 306, FIG. 3) of the computing system. In some embodiments, the method 600 is performed by a combination of the server system (e.g., including media content server 104 and CDN 106) and a client device.

The system obtains (602) information about recent media items presented to a user (e.g., via the item retrieval module 320), the information including data about a respective time of day and day of week each media item was presented to the user. For example, a user listening database (e.g., the user listening history 401) may include a list of media item identifiers with corresponding playback timestamps.

The system (604) groups the recent media items into clusters based on time of day and day of week (e.g., via the clustering module 322). For example, FIG. 4A shows the recent item information 402 being used to create the time-of-day cluster 404 and the day-of-week cluster 406. In some embodiments, the clusters include (606) a time-of-day cluster (e.g., the cluster 404), a day-of-week cluster (e.g., the cluster 406), a day-and-time cluster (e.g., the cluster 408), and a real-time cluster (e.g., the cluster 410). In some embodiments, the time-of-day cluster includes media items that were listened to by the user during a rolling time window (e.g., within 90 minutes before the current time of the user and within 120 minutes after the current time of the user).

The system (608) generates a recommendation vector using a weighted average of the clusters (e.g., via the clustering module 322). In some embodiments, the system generates the recommendation vector based on vectors generated from the clusters (e.g., the vectors 405, 407, 409, 411, and 413).

In some embodiments, the clusters are (610) weighted based on distinctiveness from overall user data (e.g., via the ranking module 324), with more distinctive clusters weighted higher than less distinctive clusters. In some embodiments, the respective cluster vectors are weighted based on distinctiveness. In some embodiments, the clusters are (612) weighted based on cosine distances to their respective centroids. In some embodiments, tighter clusters are ranked higher than looser clusters (e.g., clusters with media items that are more similar to one another are ranked higher than clusters with a wider variety of media items).

In some embodiments, the recommendation vector is modified (614) to increase distinctiveness from overall user data. For example, the recommendation vector is compared to user profile data (e.g., information from the user profile 416) and adjusted to move the recommendation vector away from the user's overall listening habits.

The system generates (616) a playlist for the user by identifying a plurality of media items using the recommendation vector (e.g., via the generation module 328). In some embodiments, the system identifies discovery media items (e.g., media not previously listened to by the user) and generates the playlist using the discovery media items. In some embodiments, the system ranks and filters the plurality of media items and generates the playlist using the ranked and filtered media items. For example, the system filters out unplayable media items and/or media items that don't comport with settings of the user's profile. In some embodiments, the system ranks the plurality of media items based on distinctiveness, artist, genre, popularity, and the like.

In some embodiments, identifying the plurality of media items using the recommendation vector includes (618) using a nearest-neighbor service. In some embodiments, identifying the plurality of media items includes applying a nearest-neighbor algorithm to a database of media items.

In some embodiments, the system (620): (i) obtains a first set of descriptors for the plurality of media items; and (ii) generates a title and a description for the playlist using the first set of descriptors (e.g., via the generation module 328).

For example, the system generates the title 508 and description 507-1 for the playlist 506-1 in FIGS. 5A-5B.

In some embodiments, the system (622): (i) obtains a second set of descriptors from historical user data (e.g., from media items in the clusters); and (ii) weights a first subset of descriptors in the first set higher than a second subset of descriptors in the first set in accordance with the first subset of the descriptors not matching descriptors from the second set. For example, the system removes, or downweights, descriptors that are similar between the recommended media items and the media items in the user's recent listening history so as to emphasize differences between the recommendations and the user's recent listening.

In some embodiments, the description of the playlist is (624) based on descriptors from a highest weighted cluster. In some embodiments, the description of the playlist is based on both descriptors from the highest weighted cluster and descriptors for the recommended media items.

In some embodiments, the system (626): (i) obtains a timing indication corresponding to a current time of day or day of week for the user; and (ii) concatenates the timing indication to the playlist title. For example, generating the playlist title including a current time of day or day of the week of the user (e.g., "Thursday afternoon" is included in the playlist title if the current day is Thursday and current time period is afternoon).

In some embodiments, a playlist image is selected (628) based on current time-of-day information from the user. For example, the system stores a plurality of playlist images (e.g., each image being associated with a particular time of day, genre, and/or mood) and selects a playlist image for the playlist from amongst the plurality of playlist images based on a current time of day for the user.

The system presents (630) the playlist to the user (e.g., via the playlist module 224). In some embodiments, the system causes the playlist to be presented to the user (e.g., via the playlist module 318). In some embodiments, the system sends the playlist to a device of the user (e.g., via the network communication module 312).

In some embodiments, the system stores (632) the playlist for the user for a preset amount of time (e.g., stores the playlist in the playlist database 338). In some embodiments, the preset amount of time is 20 minutes, 1 hour, 3 hours, or 1 day. In some embodiments, the user is presented with an option to re-generate the playlist during the preset amount of time. In some embodiments, re-generating the playlist causes deletion of the stored playlist and creation of a new playlist (e.g., via the process shown in FIG. 4A).

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of generating and presenting a personalized playlist to a user. The method is performed at a computing device (e.g., the electronic device 102 or the media content server 104) having one or more processors and memory. The method includes: (1) obtaining information about recent media items presented to (e.g., played back, listened to, consumed, and/or viewed) a user (e.g., from a user profile of the user), the information including data about a respective time of day and day of week each media item was presented to the user (e.g., a playback timestamp); (ii) grouping the recent media items into clusters based on time of day and day of week (e.g., the time-of-day cluster 404 and the day-of-week cluster 406); (iii) generating a recommendation vector using a weighted average of the clusters (e.g., the recommendation vector 414); (iv) generating a playlist for the user (e.g., the playlist 418) by identifying a plurality of media items using the recommendation vector; and (v) presenting the playlist to the user (e.g., via the user interface 502). Examples of media items include music tracks, music albums, podcasts, podcast segments, videos, audio books and/or audio book segments.

In some embodiments, each cluster is represented by a vector. In some embodiments, the recommendation vector is based on the vectors representing the clusters. In some embodiments, the recommendation vector is based on a weighted or unweighted average of the vectors representing the clusters. In some embodiments, each media item is represented by a vector, and the vector representing each respective cluster is based on the vectors representing the media items within the respective cluster. In some embodiments, the vector representing each respective cluster is based on a weighted or unweighted average of the vectors representing the media items within the respective cluster.

(A2) In some embodiments of A1, the clusters include a time-of-day cluster, a day-of-week cluster, a day-and-time cluster, and a real-time cluster (e.g., the real-time cluster includes most recently played media items). In some embodiments, the clusters include one or more clusters for other context information (e.g., whether the user has indicated they are in a private setting or public setting).

(A3) In some embodiments of A1 or A2, identifying the plurality of media items using the recommendation vector comprises using a nearest-neighbor service (e.g., a k-nearest neighbors algorithm). In some embodiments, identifying the plurality of media items includes filtering out media items the user has listened to recently (e.g., within past 1, 3, 7, or 14 days).

(A4) In some embodiments of any of A1-A3, the method further including: (i) computing a cosine distance from a centroid of each cluster to an overall user data centroid to obtain a measure of distinctiveness between clusters and overall user data; and (ii) weighting the clusters based on the measure of distinctiveness, with more distinctive clusters weighted higher than less distinctive clusters. In some embodiments, the overall user data centroid is generated from a cluster that includes all of the user's recent media items.

(A5) In some embodiments of any of A1-A4, the clusters are weighted based on distinctiveness from overall user data, with more distinctive clusters weighted higher than less distinctive clusters. In some embodiments, the clusters are weighted based on a cohesiveness of each cluster (e.g., tighter clusters are weighted higher than looser clusters). In some embodiments, clusters having less than a threshold number of media items (e.g., less than 50, 30, or 20 media items) are downweighted compared to clusters having at least the threshold number of media items.

(A6) In some embodiments of any of A1-A5, the method further includes: (i) obtaining a first set of descriptors for the plurality of media items (e.g., the descriptors 452); and (ii) generating a title and a description for the playlist using the first set of descriptors. In some embodiments, the descriptors include tags and/or labels. In some embodiments, the descriptors include information from the media item titles and/or descriptions. In some embodiments, the descriptors include descriptors for genre, activity, time, mood, artist, era, and the like.

(A7) In some embodiments of A6, the method further includes: (i) obtaining a second set of descriptors from historical user data; and (ii) weighting a first subset of descriptors in the first set higher than a second subset of descriptors in the first set in accordance with the first subset of the descriptors not matching descriptors from the second set. In some embodiments, genre, time, and/or activity descriptors in the first set of descriptors are downweighted (or filtered out). In some embodiments, mood descriptors in the first set of descriptors are upweighted.

(A8) In some embodiments of A6 or A7, the description of the playlist is based on descriptors from a highest weighted cluster. For example, the description of the playlist may be: "Since you listen to [highest cluster descriptor], we recommend [recommended item descriptor]."

(A9) In some embodiments of any of A1-A8, the method further includes modifying the recommendation vector to increase distinctiveness from overall user data. For example, the recommendation vector is adjusted to move the vector away from a recommendation vector generated from a user's overall listening history.

(A10) In some embodiments of any of A1-A9, the method further includes: (i) obtaining a current time-of-day or day-of-week information for the user; and (ii) appending a timing indication to the playlist title. In some embodiments, the current time-of-day or day-of-week information for the user is prepended (or otherwise concatenated with) the playlist title. In some embodiments, the current time-of-day information is obtained using a geoIP lookup function. In some embodiments, the timing indication includes one or more of the following terms: morning, afternoon, evening, night, Monday, Tuesday, Wednesday, Thursday, Friday, Saturday, or Sunday.

(A11) In some embodiments of any of A1-A10, the clusters are weighted based on cosine distance to the centroid of each cluster (e.g., small clusters with large cosine distances are downweighted).

(A12) In some embodiments of any of A1-A11, the method further includes selecting a playlist image based on current time-of-day information from the user. In some embodiments, the playlist image is selected from a database of playlist images based on one or more of: a current time of day, a current day of week, a genre of the playlist, and a mood of the playlist.

(A13) In some embodiments of any of A1-A12, the method further includes storing the playlist for the user for a preset amount of time (e.g., 30 minutes, 1 hour, or 3 hours). In some embodiments, the playlist is stored at a user device (e.g., the electronic device 102). In some embodiments, the playlist is stored on a server system (e.g., the media content server 104). Although this disclosure refers to the generation of playlists, the systems and methods (e.g., the method 600 and A1-A13) described herein are generally applicable to generating ordered sequences of media items (e.g., without any additional playlist features).

In another aspect, some embodiments include a computing system including one or more processors and memory coupled to the one or more processors, the memory storing one or more programs configured to be executed by the one or more processors, the one or more programs including instructions for performing any of the methods described herein (e.g., the method 600 and A1-A13 above).

In yet another aspect, some embodiments include a non-transitory computer-readable storage medium storing one or more programs for execution by one or more processors of a computing system, the one or more programs including instructions for performing any of the methods described herein (e.g., the method 600 and A1-A13 above).

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method of generating personalized playlists, the method comprising:
obtaining information about recent media items presented to a user, the information including data about a respective time of day and day of week each media item was presented to the user;
grouping the recent media items into clusters based on time of day and day of week;
generating a recommendation vector using a weighted average of the clusters, wherein the clusters include two or more of: a time-of-day cluster, a day-of-week cluster, a day-and-time cluster, or a real-time cluster;
generating a playlist for the user by identifying a plurality of media items using the recommendation vector; and
causing the playlist to be presented to the user.

2. The method of claim 1, wherein the clusters include a time-of-day cluster, a day-of-week cluster, a day-and-time cluster, and a real-time cluster.

3. The method of claim 1, wherein identifying the plurality of media items using the recommendation vector comprises using a nearest-neighbor service.

4. The method of claim 1, wherein the clusters are weighted based on distinctiveness from overall user data, with more distinctive clusters weighted higher than less distinctive clusters.

5. The method of claim 1, further comprising:
obtaining a first set of descriptors for the plurality of media items; and
generating a title and a description for the playlist using the first set of descriptors.

6. The method of claim 5, further comprising:
obtaining a second set of descriptors from historical user data; and
weighting a first subset of descriptors in the first set higher than a second subset of descriptors in the first set in accordance with the first subset of descriptors not matching descriptors from the second set.

7. The method of claim 5, wherein the description of the playlist is based on descriptors from a highest weighted cluster.

8. The method of claim 1, further comprising modifying the recommendation vector to increase distinctiveness from overall user data.

9. The method of claim 1, further comprising:
obtaining a timing indication corresponding to a current time of day or day of week for the user; and
concatenating the timing indication to a title of the playlist.

10. The method of claim 1, wherein the clusters are weighted based on, for each cluster, a cosine distance to a centroid of the cluster.

11. The method of claim 1, further comprising selecting a playlist image based on current time-of-day information from the user.

12. The method of claim 1, further comprising storing the playlist for the user for a preset amount of time.

13. A computing device, comprising:
one or more processors;
memory; and
one or more programs stored in the memory and configured for execution by the one or more processors, the one or more programs comprising instructions for:
obtaining information about recent media items presented to a user, the information including data about a respective time of day and day of week each media item was presented to the user;
grouping the recent media items into clusters based on time of day and day of week;
generating a recommendation vector using a weighted average of the clusters, wherein the clusters include two or more of: a time-of-day cluster, a day-of-week cluster, a day-and-time cluster, or a real-time cluster;
generating a playlist for the user by identifying a plurality of media items using the recommendation vector; and
causing the playlist to be presented to the user.

14. The device of claim 13, wherein the clusters include a time-of-day cluster, a day-of-week cluster, a day-and-time cluster, and a real-time cluster.

15. The device of claim 13, wherein identifying the plurality of media items using the recommendation vector comprises using a nearest-neighbor service.

16. The device of claim 13, wherein the one or more programs further comprises instructions for computing a cosine distance from a centroid of each cluster to an overall user data centroid to obtain a measure of distinctiveness between clusters and overall user data.

17. The device of claim 13, wherein the clusters are weighted based on distinctiveness from overall user data, with more distinctive clusters weighted higher than less distinctive clusters.

18. A non-transitory computer-readable storage medium storing one or more programs configured for execution by a computing device having one or more processors and memory, the one or more programs comprising instructions for:
obtaining information about recent media items presented to a user, the information including data about a respective time of day and day of week each media item was presented to the user;
grouping the recent media items into clusters based on time of day and day of week;
generating a recommendation vector using a weighted average of the clusters, wherein the clusters include two or more of: a time-of-day cluster, a day-of-week cluster, a day-and-time cluster, or a real-time cluster;
generating a playlist for the user by identifying a plurality of media items using the recommendation vector; and
causing the playlist to be presented to the user.

19. The non-transitory computer-readable storage medium of claim 18, wherein the clusters include a time-of-day cluster, a day-of-week cluster, a day-and-time cluster, and a real-time cluster.

20. The non-transitory computer-readable storage medium of claim 18, wherein the clusters are weighted based on distinctiveness from overall user data, with more distinctive clusters weighted higher than less distinctive clusters.

* * * * *